(12) United States Patent
Wroblewski et al.

(10) Patent No.: US 9,688,170 B2
(45) Date of Patent: Jun. 27, 2017

(54) SEAT ASSEMBLY HAVING A TILTABLE FRONT CUSHION MODULE

(71) Applicant: LEAR CORPORATION, Southfield, MI (US)

(72) Inventors: Krzysztof Wroblewski, Washington, MI (US); Ashford Allen Galbreath, Troy, MI (US); Wee Tzee Gam, Troy, MI (US); Asad S. Ali, Troy, MI (US); Terry O'Bannon, Royal Oak, MI (US)

(73) Assignee: LEAR CORPORATION, Southfield, MI (US)

( * ) Notice: Subject to any disclaimer, the term of this patent is extended or adjusted under 35 U.S.C. 154(b) by 120 days.

(21) Appl. No.: 14/718,178

(22) Filed: May 21, 2015

(65) Prior Publication Data

US 2015/0360592 A1    Dec. 17, 2015

Related U.S. Application Data

(60) Provisional application No. 62/011,782, filed on Jun. 13, 2014.

(51) Int. Cl.
| | |
|---|---|
| *A47C 3/00* | (2006.01) |
| *A47C 7/46* | (2006.01) |
| *B60N 2/44* | (2006.01) |
| *B60N 2/10* | (2006.01) |
| *B60N 2/22* | (2006.01) |
| *B60N 2/64* | (2006.01) |
| *B60N 2/62* | (2006.01) |
| *B60N 2/30* | (2006.01) |

(52) U.S. Cl.
CPC ............. *B60N 2/4435* (2013.01); *B60N 2/10* (2013.01); *B60N 2/22* (2013.01); *B60N 2/64* (2013.01); *B60N 2/3045* (2013.01); *B60N 2/62* (2013.01); *B60N 2002/4425* (2013.01); *B60N 2205/30* (2013.01)

(58) Field of Classification Search
CPC .... B60N 2205/30; B60N 2/3045; B60N 2/62; A47C 7/022
USPC ... 297/284.1, 452.21, 284.11, 284.8, 452.25, 297/452.53
See application file for complete search history.

(56) References Cited

U.S. PATENT DOCUMENTS

| | | |
|---|---|---|
| 4,629,248 A | 12/1986 | Mawbey |
| 4,664,444 A | 5/1987 | Murphy |
| 4,775,185 A * | 10/1988 | Scholin .................... B60N 2/62 |
| | | 297/284.11 |

(Continued)

FOREIGN PATENT DOCUMENTS

| | | |
|---|---|---|
| WO | 2012138472 A2 | 10/2012 |
| WO | 2013144622 A1 | 10/2013 |
| WO | 2013156788 A1 | 10/2013 |

*Primary Examiner* — Chi Q Nguyen
(74) *Attorney, Agent, or Firm* — Brooks Kushman P.C.

(57) ABSTRACT

A vehicle seat assembly having a seat bottom that includes first and second side frame members and a front cushion module. The front cushion module has a support member and a cushion. The support member has first and second ends that are disposed proximate the front end of the first and second side frame members, respectively. The cushion receives and is supported by the support member and has a front end. The vehicle seat assembly may have an actuator cooperable with the support member for tilting the front end of the cushion relative to the frame members.

20 Claims, 4 Drawing Sheets

(56) References Cited

U.S. PATENT DOCUMENTS

| | | | | |
|---|---|---|---|---|
| 4,913,492 | A * | 4/1990 | Shovar | B60N 2/23 297/300.5 |
| 5,120,109 | A * | 6/1992 | Rangoni | B60N 2/1803 297/284.3 |
| 6,042,190 | A | 3/2000 | Mathe et al. | |
| 6,386,631 | B1 * | 5/2002 | Masuda | B60N 2/4221 297/216.1 |
| 6,648,409 | B1 * | 11/2003 | Laporte | B60N 2/42718 297/216.1 |
| 6,935,691 | B1 * | 8/2005 | Sasaki | B60N 2/0812 248/421 |
| 7,594,398 | B2 * | 9/2009 | Gronberg | F02M 26/24 60/605.2 |
| 7,946,649 | B2 | 5/2011 | Galbreath et al. | |
| 9,421,894 | B2 * | 8/2016 | Line | B60N 2/62 |
| 2004/0075312 | A1 | 4/2004 | Neale | |
| 2004/0084937 | A1 | 5/2004 | Berta | |
| 2006/0049682 | A1 | 3/2006 | Yamanaka | |
| 2007/0236071 | A1 * | 10/2007 | Fujita | B60N 2/70 297/452.5 |
| 2007/0257531 | A1 | 11/2007 | Mashimo | |
| 2008/0001425 | A1 | 1/2008 | Castro | |
| 2008/0157577 | A1 * | 7/2008 | Lindsay | B60N 2/0224 297/284.11 |
| 2011/0260506 | A1 * | 10/2011 | Kuno | B60N 2/4495 297/84 |
| 2012/0187739 | A1 | 7/2012 | Folkert et al. | |
| 2014/0265506 | A1 * | 9/2014 | McMillen | B60N 2/4838 297/408 |
| 2015/0283931 | A1 * | 10/2015 | Line | B60N 2/62 297/423.19 |

\* cited by examiner

SEAT ASSEMBLY HAVING A TILTABLE FRONT CUSHION MODULE

CROSS-REFERENCE TO RELATED APPLICATIONS

This application claims benefit of U.S. Provisional Application No. 62/011,782 filed on Jun. 13, 2014, the disclosures of which are incorporated in their entirety by reference herein.

TECHNICAL FIELD

The present application relates to a seat assembly having a tiltable front cushion module.

BACKGROUND

A vehicle seat having a thigh support is disclosed in U.S. Pat. No. 4,629,248 and WO 2012/138472.

SUMMARY

In at least one embodiment, a vehicle seat assembly is provided. The vehicle seat assembly may include a seat back that is pivotally disposed on a seat bottom. The seat bottom may have first and second side frame members and a front cushion module. The first and second side frame members may each have a rear end disposed proximate the seat back and a front end disposed opposite the rear end. The front cushion module may have a support member and a cushion. The support member may have first and second ends that may be disposed proximate the front end of the first and second side frame members, respectively. The cushion may receive and may be supported by the support member and have a front end. The vehicle seat assembly may have an actuator cooperable with the support member for tilting the front end of the cushion relative to the frame members.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
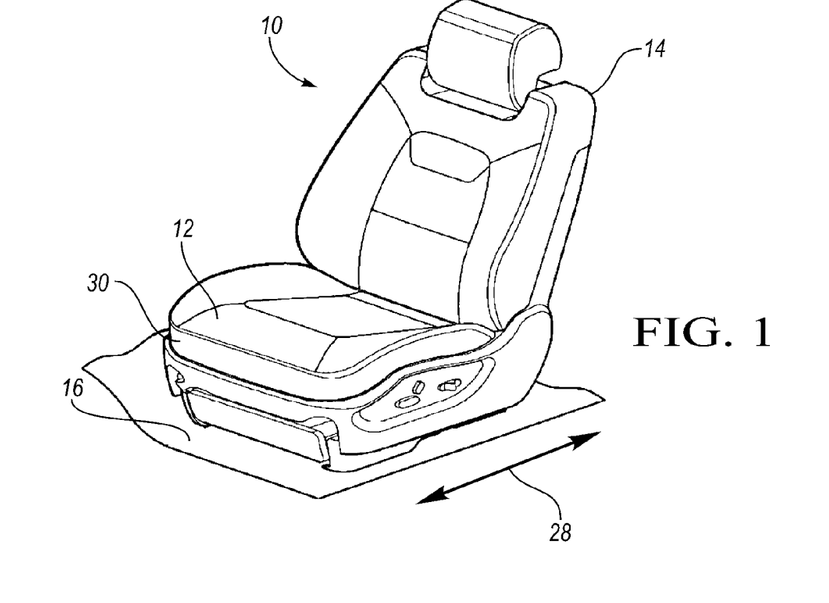
FIG. 1 is a perspective view of an exemplary seat assembly.
Figure 7:
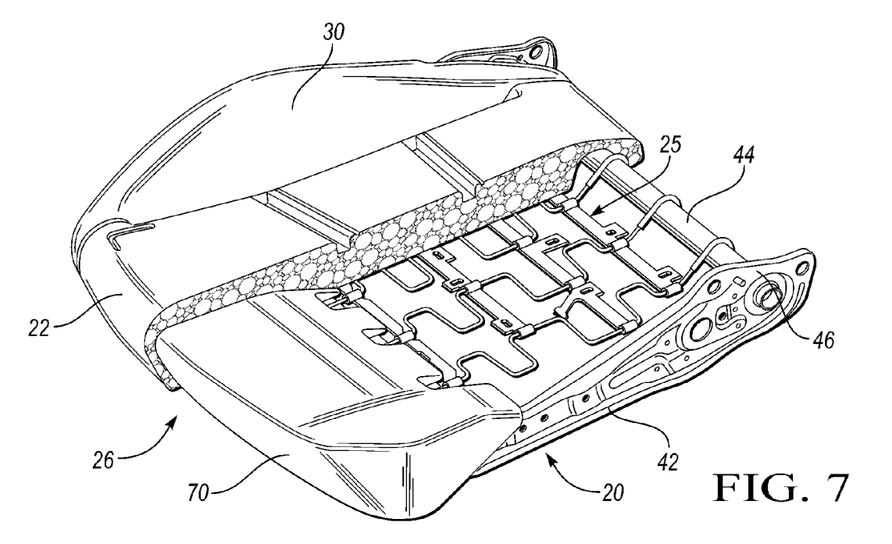
FIG. 7 is similar to FIG. 3 with various components partially removed.

Referring to FIGS. 1 and 7, an exemplary seat assembly 10 is shown. The seat assembly 10 may be configured for use in a vehicle, such as motor vehicle like a car or truck. The seat assembly 10 may include a seat bottom 12 and a seat back 14 that may be pivotally disposed on the seat bottom 12. The seat bottom 12 may be mounted to a surface 16, such as a vehicle floor.

Figure 2:
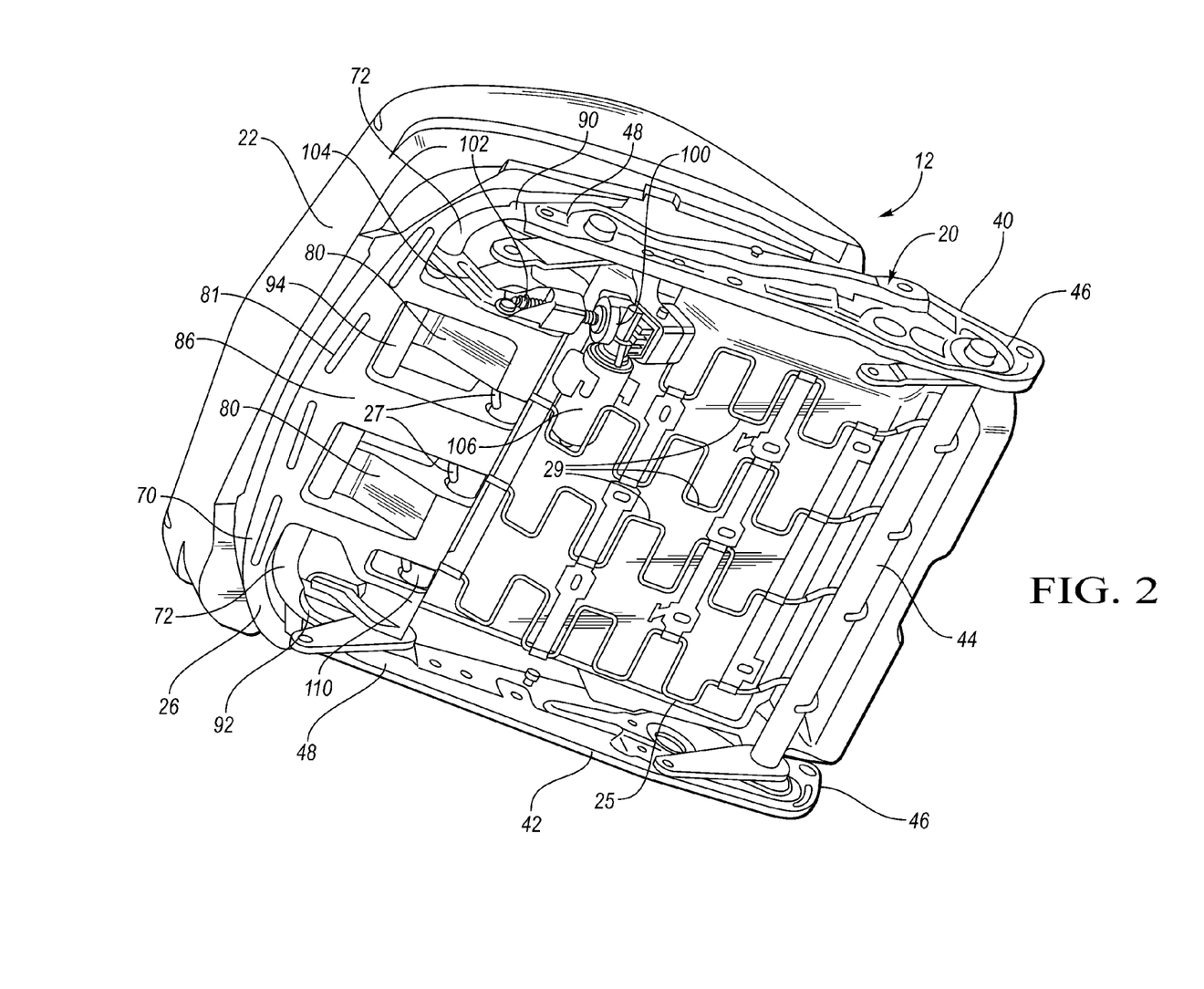
FIG. 2 is a perspective underneath view of a portion of a seat bottom of the seat assembly having a tiltable front cushion module.

Referring to FIGS. 1 and 2, the seat bottom 12 may include a seat bottom frame 20, a seat height adjuster (not shown), a seat cushion 22 supported by the frame for cushioning an occupant, a front cushion module 26, a suspension mat 25, and a trim cover assembly 30.

The seat bottom frame 20 may provide a load bearing structure for the seat bottom 12. In at least one embodiment, the seat bottom frame 20 may include a first side frame member 40, a second side frame member 42, a rear frame cross member 44 and a front frame cross member 110.

The first and second side frame members 40, 42 may be spaced apart from each other and may extend generally parallel to each other along opposing lateral sides of the seat bottom 12. While shown as being one-piece components, one or both of the side fame members 40, 42 could be two or more separate components. The first and second side frame members 40, 42 may each include a rear end 46 that may be disposed proximate the seat back 14 and a front end 48 that may be disposed opposite the rear end 46. The front end 48 may be disposed adjacent to the front cushion module 26 as will be discussed in more detail below. The rear cross member 44 and the front cross member 110 may each be fixed to and extend from the first side frame member 40 to the second side frame member 42. In the embodiment shown, the front cross member 44 is disposed proximate the rear end 46 of the first and second side frame members 40, 42 of the frame 20 and may be generally located under the seat back 14 and the rear cross member 110 is disposed proximate the front end 48 of the frame 20.

At least one track assembly (not shown) may be provided to facilitate movement of the seat assembly 10 relative to the mounting surface 16. In at least one embodiment, two track assemblies are provided. The track assemblies may be fixedly disposed on the mounting surface 16. One track assembly may be generally disposed under the first side frame member 40 and another track assembly may be generally disposed under the second side frame member 42. The track assemblies 22 and the side frame members 40, 42 may be configured to facilitate movement of the seat bottom 12 in a fore/aft direction, or in a forward direction and a rearward direction. The forward and rearward directions are represented by the double arrowed line 28 in FIG. 1, in which the forward direction arrow points toward the left and the rearward direction arrow points toward the right.

A seat height adjuster (not shown) may be provided to facilitate movement of the seat bottom 12 in one or more directions with respect to a track assembly. For instance, the seat height adjuster may permit the seat bottom 12 to move in a vertical direction (up/down) and/or tilt the seat bottom 12 toward or away from the mounting surface 16. The seat height adjuster may be manually actuated or may be power actuated. In a power actuated embodiment, one or more actuators, such as a bi-directional electric motor, may be used to actuate at least a portion of the seat assembly 10 in one or more directions. In at least one embodiment, the seat height adjuster may include one or more mounting brackets, a first front linkage, a second front linkage, a first rear linkage, and a second rear linkage. One or more mounting brackets may be fixedly disposed on each track assembly. A mounting bracket may be mounted to a top surface of a track assembly and extend generally upward or away from the mounting surface.

The front cushion module 26 may be mounted to the front of the seat bottom frame 20. The front cushion module 26 may be configured to generally support the thigh region of a seat occupant. In addition, the front cushion module 26 may be disposed forwardly of or completely in a forward direction from the seat height adjuster in one or more embodiments. The front cushion module 26 may be provided in various embodiments. For example, the front cushion module 26 may include a cushion 70, a support member 72, and optionally a cross member (not shown).

The cushion 70 may be disposed under the trim cover assembly 30 to cushion and support a seat occupant. In at least one embodiment, at least a portion of the cushion 70 may extend generally along and above the first and second side frame members 40, 42 to provide localized cushioning.

The cushion 70 may be made of any suitable material, such as structural foam. Any suitable structural foam can be employed. In at least one embodiment, suitable structural foams may have a rigidity and/or hardness (i.e., compressive strength) that is higher than conventional high resilience seating cushion polyurethane foam. One suitable structural foam is a relatively stiff, rigid polyurethane foam. Another suitable example is an expanded polymer layer.

In at least one embodiment, a suitable structural foam comprises a molded expanded polyolefin (EPO) layer. Suitable examples of expanded polyolefin (EPO) include, but are not necessarily limited to, expanded polyethylene (EPE), expanded polypropylene (EPP), expanded polybutylene (EPB), and copolymers of ethylene, propylene, butylene, 1,3-butadiene, and other olefin monomers, such as alpha-olefin monomers having from 5-18 carbon atoms, and/or cycloalkylene monomers such as cyclohexane, cyclopentene, cyclohexadiene, norbornene, and aromatic substituted olefins, such as styrene, alpha-methylstyrene, paramethylstyrene, blends thereof and the like.

In at least one particular preferred embodiment, the EPO is expanded polypropylene (EPP) and its copolymers with ethylene, propylene and butylene. Any suitable EPP may be used, however in at least one embodiment, suitable EPPs include, but are not limited to, ARPRO® EPP available from JSP International and EPP available from Kaneka.

Expanded polyolefins can be prepared by an expanded bead forming process in which relatively small uniform beads of polymer are produced, containing a gas which is utilized to effect blowing during the bead forming process. The most commonly used gas is air although other gases including low boiling point liquids which produce gases at the molding temperatures may be used. Suitable gases include, but are not limited to air, nitrogen, carbon dioxide, pentene and the like.

The expanded polyolefin can be formed into the cushion 70 via any suitable forming process, such as exposing to steam in a mold, e.g., "steam chest molding". In at least one embodiment, the beads used to form the cushion 70 have an average bead size of 0.5 to 8.0 mm, and in other embodiments of 1.0 to 6.0 mm.

The cushion 70 may include a set of notches 80. The notches 80 may be spaced apart from each other and may extend substantially parallel to each other in a direction extending from a front surface 82 of the cushion 70 toward a back surface 84 of the cushion 70 that is disposed opposite the front surface 82. Each notch 80 may also extend from a bottom surface 86 of the cushion 70 toward a top surface 88 that is disposed opposite the bottom surface 86. As such, each notch 80 may be open toward and generally accessible from the front and bottom of the front cushion module 26. The notches 80 can allow the front cross member 110 to receive the front hooks 27 of the suspension pan 25.

The cushion 70 may also be provided with different heights or thicknesses from the bottom surface 86 to the top surface 88 to help provide modular seat designs in which common components of the seat bottom frame 20, track assemblies, and/or seat height adjuster are employed in different seat assembly designs, but the configuration of the front cushion module 26 and/or cushion 70 may be modified to provide different seat cushion heights or "H points" for different seat assembly models or vehicle seat models.

The support member 72 may support the cushion 70. The support member 72 may have any suitable configuration. For example, the support member 72 may be configured as a solid member, a hollow tube, a wire, or combinations thereof. In addition, the support member 72 may be provided as a unitary one piece component or may be assembled from multiple components. For instance, the support member 72 may include one or more tubes, solid portions, wires, and/or brackets that may be assembled together.

Figure 3:
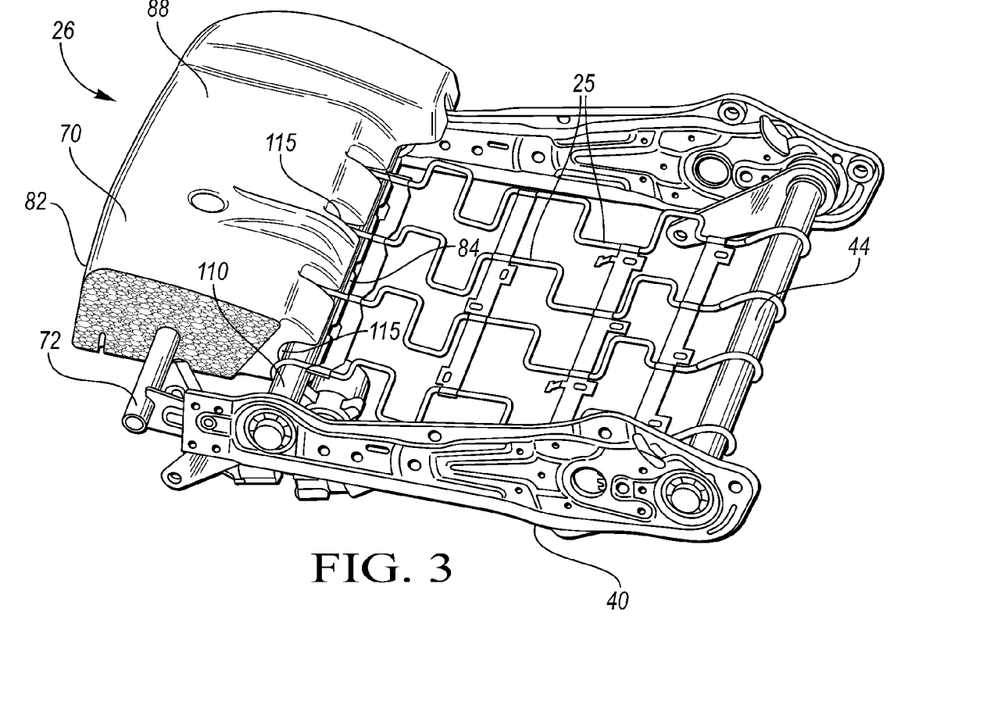
FIG. 3 is top perspective view of a portion of the seat bottom illustrated in FIG. 2 with foam portions and trim cover removed.
Figure 6:
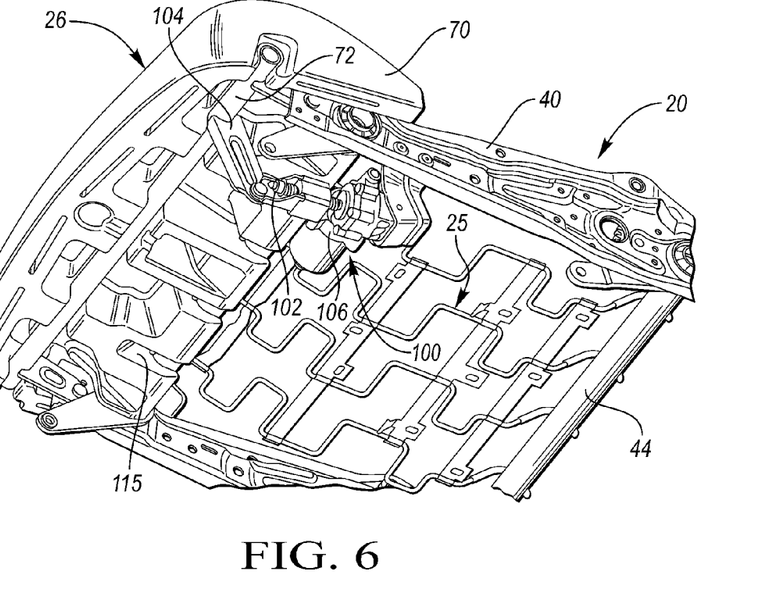
FIG. 6 is similar to FIG. 3 but showing a bottom perspective view.

The support member 72 may be integrally molded into the cushion 70 or may be inserted into a slot in the cushion 70. In at least one embodiment, the support member 72 may include a first end portion 90 and a second end portion 92 disposed opposite the first end portion 90. The first and second end portions 90, 92 may be fixedly coupled to the front end 48 of the first and second side frame members 40, 42, respectively. The first and second end portions 90, 92 may be flattened to form an enlarged region that may include a hole for receiving a fastener, such as a rivet, pin, screw, or bolt, which may be used to couple the support member 72 to the first and second side frame members 40, 42. The support member 72 may extend in a forward direction from the first and second side frame members 40, 42 and may include a front portion 94 that may be spaced apart from the front surface 82 of the cushion 70. The front portion 94 may extend laterally, or generally in a direction that extends between the left and right sides of the seat assembly 10. As such, the support member 72 may be accessible within each notch 80 to facilitate coupling of the trim cover assembly 30 as will be described in more detail below. As shown in FIGS. 3 and 6, the curved support member 72 can be replaced with a straight tube or rod member. Furthermore, support member 72 does not have to be molded onto the cushion 70 but can instead be snap fit into a groove therein. In addition to a snap fit connection, a clip or other member could be provided to help maintain the cushion 70 on the support member 72.

If a cross member is provided, it may also support the cushion 70 and a seat occupant. The optionally provided cross member may be integrally molded with the cushion 70 or may be provided as a separate component that may receive or may be inserted into the cushion 70 Like the cushion 70, the optionally provided cross member may also be provided in different configurations to facilitate modular seat designs in which the configuration of the front cushion module 26 is modified to provide different H points and for different seat designs.

The optionally provided cross member may be spaced apart from the support member 72 and additionally may be disposed above the support member 72 or closer to the top surface 88 of the cushion 70 than the support member 72. The optionally provided cross member may extend laterally between the first and second side frame members 40, 42 and may extend in a forward direction from the first ends 48 of the first and second side frame members 40, 42.

The optionally provided cross member may include a first mounting flange and a second mounting flange that each may extend from or through opposite sides of the cushion 70 and may be coupled to the first and second side frame members 40, 42, respectively. In at least one embodiment, the first and second mounting flanges of the optionally provided cross member may be disposed on a top surface of the first and second side frame members 40, 42 and may be secured to the first and second side frame members 40, 42 in any suitable manner, such as by welding or with a fastener like a rivet, pin, screw, or bolt.

The optionally provided cross member may also include an angled portion that may be disposed between and below the first and second mounting flanges of the optionally provided cross member. The angled portion may extend downward at an angle toward the mounting surface 16 and may include a set of holes that may be spaced apart from each other and may be configured to facilitate mounting of a suspension mat as will be discussed in more detail below.

The suspension mat 25 may be coupled to the seat bottom frame 20 to help support a seat cushion and a seat occupant. The suspension mat 25 may include a plurality of wires 29 that may be located between the first and second side frame members 40, 42 and that may engage the frame cross members 44 and 110.

The trim cover assembly 30 may be disposed on the seat bottom 12 and may provide an exterior seating surface. The trim cover assembly 30 may include a trim cover that may be made of any suitable material, such as fabric, leather, vinyl, or combinations thereof. The trim cover assembly 30 may also include set of attachment features may facilitate coupling of the trim cover assembly 30 to the front cushion module 26. In at least one embodiment, the attachment features may be configured as clips, hooks, pins, or retention features that may be coupled to the trim cover. In one embodiment, the attachment features include J-clips that are received in grooves 80 of the front cushion module 26 and clips secured to the frame 20 and/or rear frame cross member 44. Additional attachment features may also be provided with the trim cover assembly 30 to facilitate coupling to other seat components.

In addition to facilitating trim cover installation, suspension mat installation, and seat modularity, the front end module 26 may allow for the reduction of seat frame components and for reduced seat weight. For instance, front profile members that extend around the side frame members 40, 42 to enclose the cushion may be deleted. In addition, lateral reinforcement tubing that extends from side to side near the front of the seat bottom 12 may be deleted.

Figure 4:
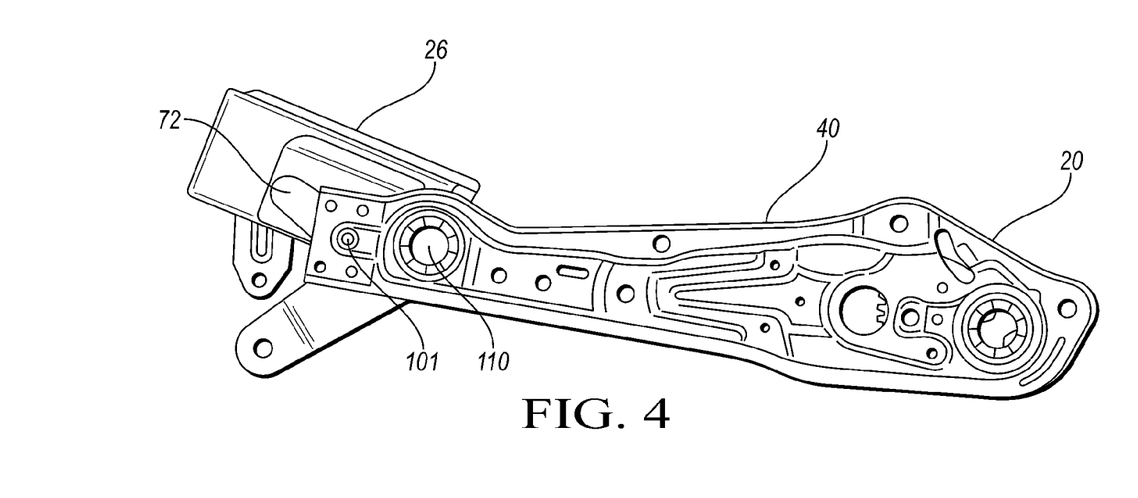
FIG. 4 is a side view of the seat bottom assembly showing the front cushion module in a position.
Figure 5:
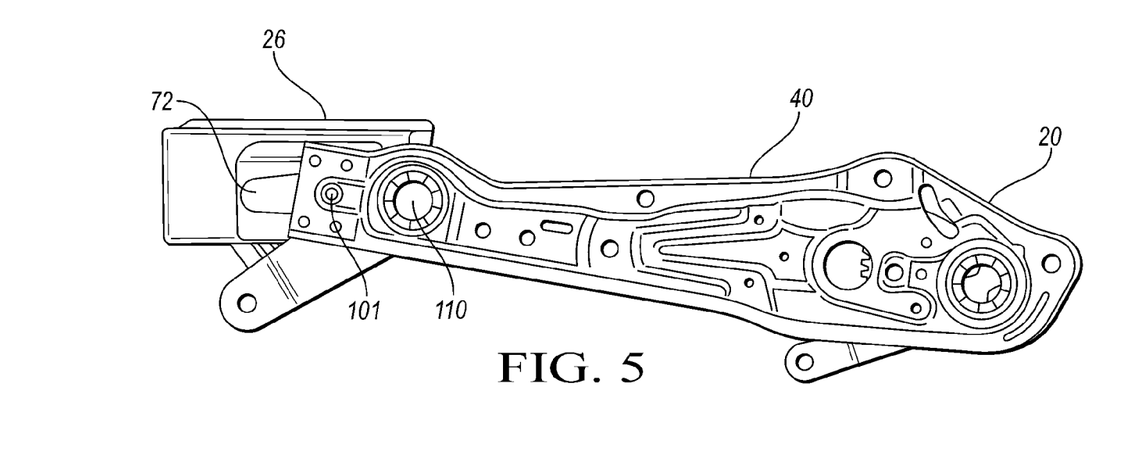
FIG. 5 is a similar to FIG. 4 showing the front cushion module in a different position.

The front end module 26 is tiltable relative to the seat frame 20, and in particular to the frame members 40, 42, as best shown in FIGS. 4-5. Referring to FIG. 2, an actuator 100 is associated with the seat frame 20 and cooperates with the front end module 26 to pivot the front end module to a desired position. As best shown in FIGS. 4-5, the support member 72 pivotally connects to the frame 20 at the front ends of frame members 40, 42 via any suitable connection, such as a rivet 101 or bolt. The actuator 100 includes a motor hook up tilt link 102 and a linkage 104 is shown extending between the member 72 and the motor 106 to enable pivotal movement of the member 72 and thus the cushion 70 of the front cushion module 26. Upon tilting, the cushion 70 rotates on member 72 and 110 and slides forward or rearward on member 110, depending upon the direction of the tilting.

For instance, when the cushion 70 is tilted upward (FIG. 4) away from the frame member 20, the cushion 70 rotates on support member 72 and rotates on and slides rearwardly on front cross member 110. Conversely, when cushion 70 is titled downward (FIG. 5), cushion 70 rotates on support member 72 and rotates on and slides forward on front cross member 110.

To facilitate the sliding movement of cushion 70 on member 110, the cushion 70 can be provided with a laterally extending groove 115 which the cross member 110 is received within. In at least one embodiment, the laterally extending groove 115 has a width greater than the width of the cross member 110 to allow for the sliding movement. In at least one embodiment, the laterally extending groove 115 has a width of 1 to 8 mm, and in at least another embodiment of 2 to 5 mm. Additionally, the cushion 70 may be provided with lubricant and/or other bearing surface member(s) to facilitate pivotal movement of the cushion on the members 72 and 110. With respect to lubricants, any suitable lubricant, such as a dry lubricant, can be used. Examples of suitable lubricants include AbsoLube 5111A and RheoGel 1227. AbsoLube 5111A is a synthetic grease made from polyfluoropolyether fluid thickened with polytetrafluoroethylene and cut with non-combustible fluorinated solvent. RheoGel 1227 is a medium base oil viscosity grease fortified with polytetrafluoroethylene. With respect to providing bearing surface member(s), one or both of the members 72 and 110 could be disposed within a tube for the members 72 and/or 110 to pivot therein.

As can be readily envisioned, the ability to tilt the front cushion module 26 enables adjustment to move comfortable positions for various size occupants. As can be appreciated from the above, the front end module 26 is pivotally attached to the frame members 40, 42 on both sides of the frame 20. In the embodiment disclosed in FIG. 2, a link for the motor power screw extender is welded onto one side of the member 72. The cushion 70 is pivotally molded over the center portion of the member 72. The slider joint 110 is provided over the rear end of the cushion 70 in the area of this cushion suspension hook up. Foam can transition from the suspension front area to the cushion 70 for gradual thickness increased to provide comfortable adjustment.

It should be appreciated that front and side bottom edges of the cushion 70 can be shaped with trenches for trim cover attachment. Support member and trim attachment can be switched to cushion side members bottom edge for continuous trim line. It is conceivable that no stretch/deformation of the trim cover can be had such that movement/rotation up and/or down of the front end module 26 should not provide appreciable stress to the trim cover assembly 30. Furthermore, the upper surface of the cushion 70 can be shaped for upper leg contour and can have trenches for trim cover (A surface) tie-downs, including cross trench if placed above the support member 72.

While not intended to be limiting, some perceptual advantages of the present disclosure attributable at least in part to the cushion 70 include:

alleviating the need for stamped cushion pan, which saves on tooling on low volume programs;

allowing direct trim cover hook-ups with trenches molded to the bottom of the cushion 70;

allowing contour shaped upper surfaces to fit plus pad and to allow for flexible styling;

alleviating the need for bearing system and pivoted joints (bolted plastic blocks from traditional designs are not needed), however, the support and/or cross members may be provided with some type of lubricant before molding;

allowing the hardware components in traditional designs (with stamped cushion pan), to be used; and allowing relatively easy suspension front hook-ups to the front cross member 72 (such as in a typical ECO plus suspension system), to be used.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
   a seat back pivotally disposed on a seat bottom, the seat bottom including:
   first and second side frame members that each have a rear end disposed proximate the seat back and a front end disposed opposite the rear end; and
   a front cushion module including:
      a support member having first and second ends disposed proximate the front end of the first and second side frame members, respectively;
      a front cushion supported by the support member, and the front cushion having a front end; and
      an actuator cooperable with the support member for pivotally tilting the front end of the front cushion relative to the frame members.

2. The vehicle seat assembly of claim 1 wherein the actuator is a tilt link motor hook up that causes movement of the support member to move the front end of the front cushion relative to the frame members.

3. The vehicle seat assembly of claim 1 wherein the front cushion is expanded polypropylene (EPP) foam.

4. The vehicle seat assembly of claim 1 wherein the front cushion includes a front surface and a set of notches that extend from the front surface, wherein each member of the set of notches is spaced apart from each other and wherein the support member extends through each member of the set of notches.

5. The vehicle seat assembly of claim 1 further including a frame cross member extending between the first and second side members, the front cushion pivoting on the support member and the frame cross member and sliding externally on the frame cross member during tilting.

6. The vehicle seat assembly of claim 1 where the seat bottom includes a second seat cushion disposed over the front cushion and a trim cover disposed over the second seat cushion.

7. The vehicle seat assembly of claim 1 wherein the seat bottom is disposed on a track assembly that facilitates fore-aft positioning of the vehicle seat assembly, and wherein the first and second side frame members are part of a seat height adjuster that facilitates positioning of the seat bottom with respect to the track assembly.

8. A vehicle seat assembly comprising:
   a seat back pivotally disposed on a seat bottom, the seat bottom including:
   a frame member having a rear end disposed proximate the seat back and a front end disposed opposite the rear end, the frame member having a frame cross member disposed adjacent to and rearward the front end of the frame member and;
   a front cushion module including:
      a support member having first and second ends disposed proximate the front end of the frame member, respectively;
      a structural foam front cushion that receives and is supported by the support member, and the structural foam front cushion having a front end; and
      an actuator cooperable with the support member for tilting the front end of the structural foam front cushion relative to the frame members, the front cushion pivoting on the support member and the frame cross member and sliding externally on the frame cross member during tilting.

9. The vehicle seat assembly of claim 8 wherein the actuator is a tilt link motor hook up that causes movement of the support member to move the front end of the structural foam front cushion relative to the frame members.

10. The vehicle seat assembly of claim 8 wherein the actuator causes movement of the support member to move the front end of the structural foam front cushion relative to the frame members.

11. The vehicle seat assembly of claim 8 wherein the structural foam front cushion is expanded polypropylene (EPP) foam.

12. The vehicle seat assembly of claim 8 wherein the structural foam front cushion includes a front surface and a set of notches that extend from the front surface, wherein each member of the set of notches is spaced apart from each other and wherein the support member extends through each member of the set of notches.

13. The vehicle seat assembly of claim 8 where the seat bottom includes a second seat cushion disposed over the front cushion and a trim cover disposed over the second seat cushion.

14. A vehicle seat assembly comprising:
   a seat bottom including:
      a frame member having a rear end and a front end disposed opposite the rear end; and
      a front cushion module including:
         a front cushion of structural foam pivotally disposed proximate the front end of the frame member, respectively; and
         an actuator cooperable with the front cushion for tilting a front end and a rear end of the front cushion relative to the frame member.

15. The vehicle seat assembly of claim 14 wherein the actuator is a tilt link motor hook up that causes movement of the front end of the front cushion relative to the frame member.

16. The vehicle seat assembly of claim 14 wherein the front cushion is expanded polypropylene (EPP) foam.

17. The vehicle seat assembly of claim 14 wherein the front cushion module includes a support member associated with the frame member for supporting the front cushion and the front cushion includes a front surface and a set of notches that extend from the front surface, wherein each member of the set of notches is spaced apart from each other and wherein the support member extends through each member of the set of notches.

18. The vehicle seat assembly of claim 17 further including a frame cross member extending between first and second side members of the frame member, the front cushion pivoting on the support member and the frame cross member and sliding externally on the frame cross member during tilting.

19. The vehicle seat assembly of claim 18 wherein the seat bottom is disposed on a track assembly that facilitates fore-aft positioning of the vehicle seat assembly, and wherein the first and second side frame members are part of a seat height adjuster that facilitates positioning of the seat bottom with respect to the track assembly.

20. The vehicle seat assembly of claim 14 where the seat bottom includes a second seat cushion disposed over the front cushion and a trim cover disposed over the second seat cushion.

* * * * *